United States Patent [19]
Sears et al.

[11] 3,844,191
[45] Oct. 29, 1974

[54] APPARATUS FOR SEVERING LINEAR ELEMENTS

[75] Inventors: James H. Sears; Paul M. Vucish, both of Anderson, S.C.

[73] Assignee: Owens-Corning Fiberglas Corporation, Toledo, Ohio

[22] Filed: June 7, 1973

[21] Appl. No.: 367,924

Related U.S. Application Data

[62] Division of Ser. No. 284,298, Aug. 28, 1972, Pat. No. 3,771,981.

[52] U.S. Cl. ............... 83/420, 83/440.1, 83/449, 83/487, 83/508
[51] Int. Cl. .............................................. B26d 1/20
[58] Field of Search .......... 83/440, 440.1, 444, 449, 83/485, 487, 488, 508, 409.2, 420

[56] References Cited
UNITED STATES PATENTS

| | | | |
|---|---|---|---|
| 2,936,664 | 5/1960 | Myers | 83/487 |
| 3,162,080 | 12/1964 | Hemker | 83/420 X |
| 3,205,745 | 9/1965 | Hammer et al. | 83/444 |
| 3,496,817 | 2/1970 | Staats et al. | 83/487 X |
| 3,525,281 | 8/1970 | Mc Gill | 83/449 X |

Primary Examiner—Frank T. Yost
Attorney, Agent, or Firm—Carl G. Staelin; John W. Overman; Ronald C. Hudgens

[57] ABSTRACT

Apparatus for severing linear elements such as glass strands; the apparatus includes means providing spaced apart opposing surfaces defining a space for extension of a linear element therethrough, a movable member with a cutting edge adjacent the space and means for reciprocating the member laterally of the space to sever linear elements extended through the space across the member. The apparatus is used in a continuous glass filament forming operation together with an interim collection container.

13 Claims, 12 Drawing Figures

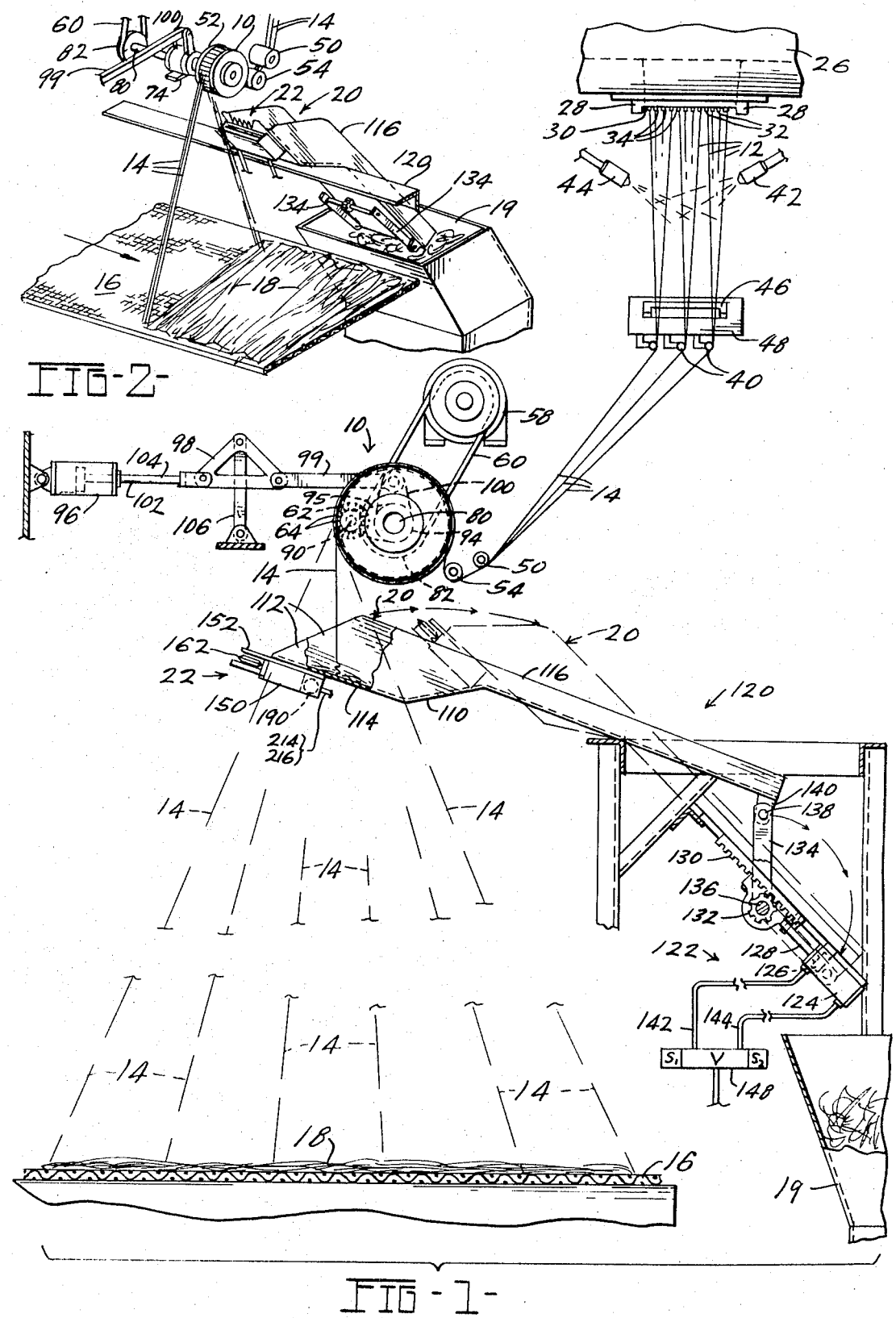

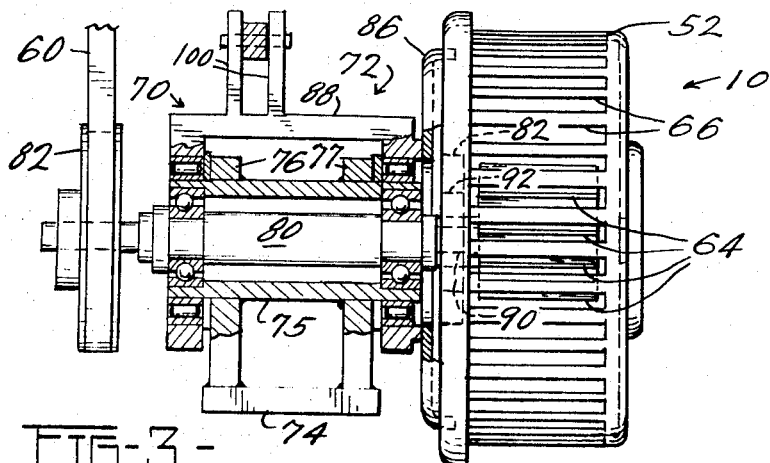
FIG-3-
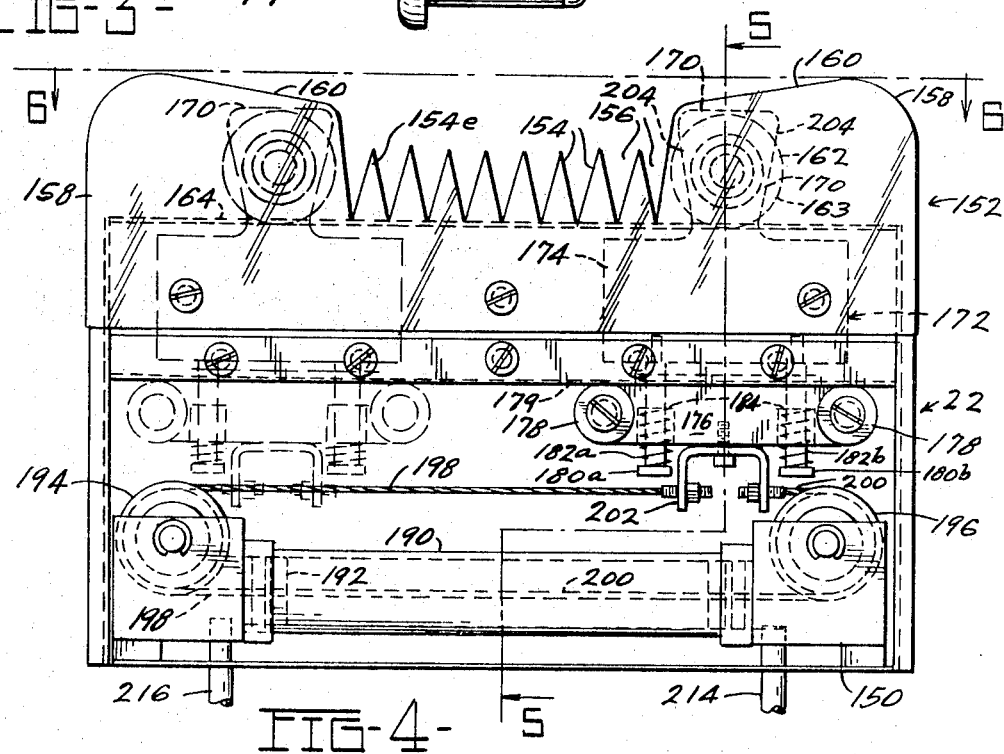
FIG-4-
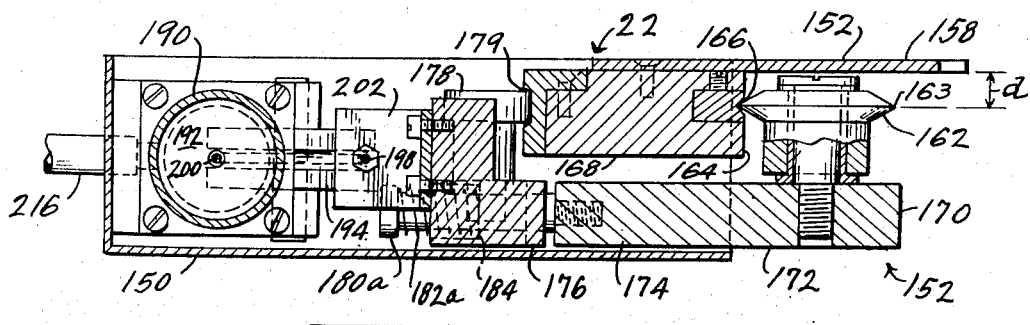
FIG-5-

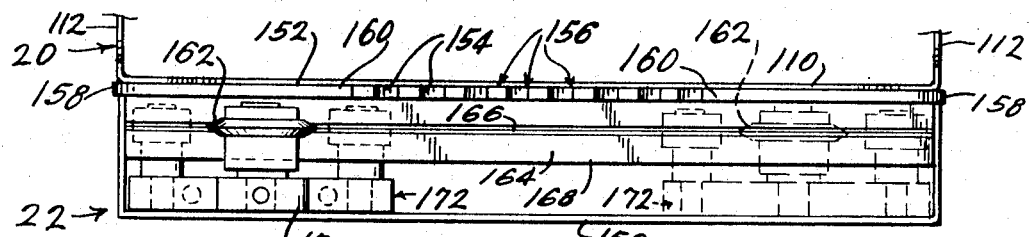
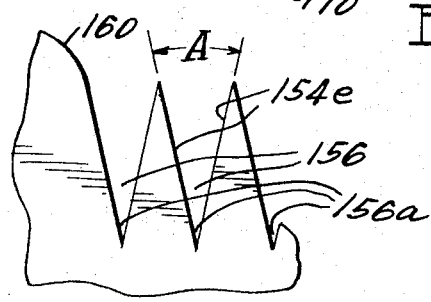
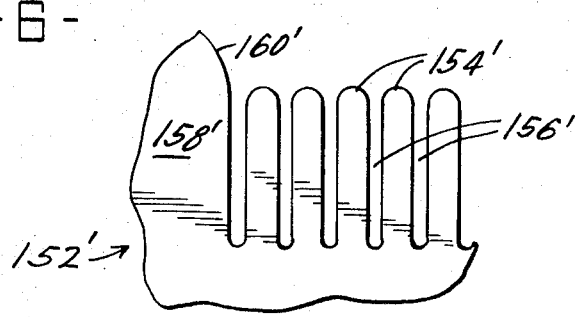
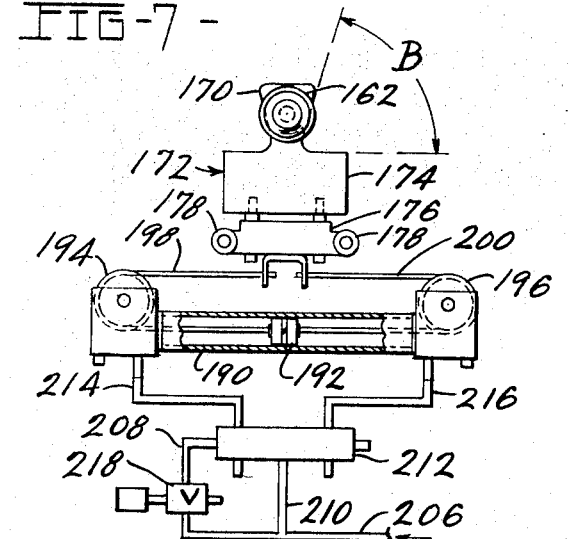
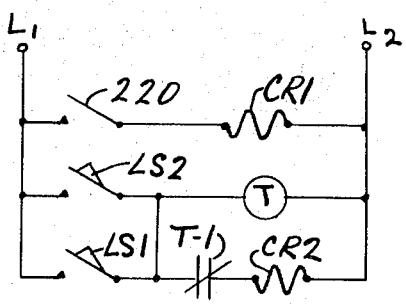
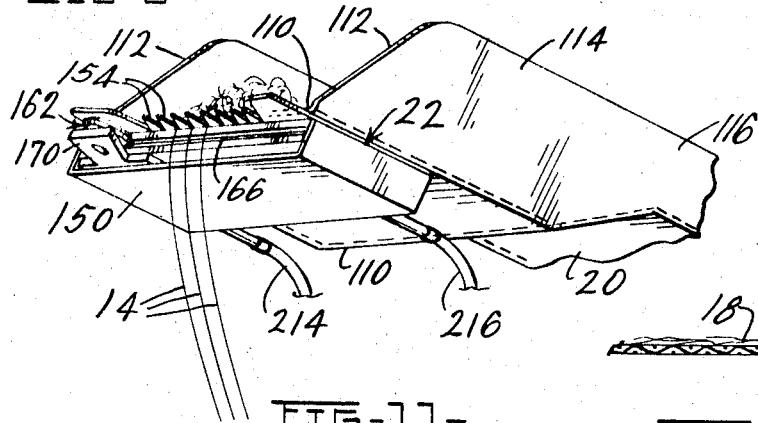
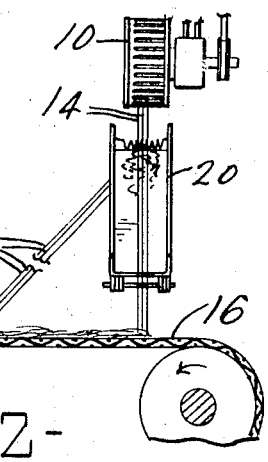

APPARATUS FOR SEVERING LINEAR ELEMENTS

This is a division of application Ser. No. 284,298, filed Aug. 28, 1972, now U.S. Pat. No. 3,771,981.

BACKGROUND OF THE INVENTION

Improved apparatus for severing bundles of filaments, especially bundles of glass filaments, has been needed for years. This need has been especially keen in the manufacture of continuous glass strand mat. But the need has not heretofore been met.

It has been customary to produce continuous glass strand mat in a glass filament forming operation using a rotary pulling and advancing device in the form of a pulling wheel. Here the rotating pulling wheel simultaneously effects attenuation of continuous glass filaments from molten glass streams supplied by a feeder and delivers the filaments in strand form to a moving collection surface. Many pulling wheels usually are employed to feed a single collection surface; and each wheel normally delivers many strands. Hence, an operator is kept busy insuring all the pulling wheel positions are kept functioning properly. Broken strands or interrupted delivery of strand from a rotating pulling wheel adversely effects the quality of mat produced. Improved apparatus, including improved strand severing apparatus, is needed under these emergency production conditions as well as at start-up.

SUMMARY OF THE INVENTION

An object of the invention is improved apparatus for severing linear elements, especially multifilament linear elements such as glass strand.

Another object of the invention is improved apparatus for producing continuous glass strand mat.

Still another object of the invention is improved apparatus for handling and severing continuous glass strand in a glass filament forming operation upon demand and at start-up where rotary means delivers glass strand linearly to a collection surface in producing a continuous strand mat.

Other objects and advantages will become more apparent as the invention is described in more detail with reference made to the accompanying drawings.

DESCRIPTION OF THE DRAWINGS

FIG. 1 is a side view in elevation of apparatus embodying the principles of the invention in use in a glass filament forming operation. A rotary pulling device simultaneously attenuates continuous glass filaments from streams of molten glass and feeds the filaments gathered in strand form to a moving collection surface.

FIG. 2 is a somewhat simplified view in perspective of apparatus shown in FIG. 1.

FIG. 3 is an enlarged front view in elevation, partially in section, of the pulling wheel shown in FIGS. 1 and 2. FIG. 3 shows the rotary support for the wheel.

FIG. 4 is an enlarged plan view of severing apparatus according to the principles of the invention.

FIG. 5 is a side view in elevation of the severing apparatus in section taken along the lines 5—5 in FIG. 4.

FIG. 6 is a front view in elevation of the severing apparatus shown in FIGS. 4 and 5.

FIG. 7 is an enlarged plan view of the tapered finger arrangement of the strand retaining member of the severing apparatus shown in FIGS. 4–6.

FIG. 8 is a plan view of one end of another retaining member according to the principles of the invention.

FIG. 9 is a somewhat diagrammatic showing of an air supply and pneumatic blade reciprocating apparatus of the severing apparatus.

FIG. 10 is an overall electrical control diagram from the apparatus shown in FIGS. 1 and 2.

FIG. 11 is a view in perspective of the strand collection chute shown in FIGS. 1 and 2 in a tilted disposition with a load of scrap glass strand. Strand is shown hanging from the open forward end of the chute in position for severance by the strand severing apparatus.

FIG. 12 is a side view in elevation of the apparatus shown in FIG. 2 after the strand collection chute has collected a load of scrap strand but before the strand severing apparatus has separated the strand between the chute and moving collection surface. The strand from the chute is shown being moved down stream of the apparatus with mat on the advancing collection surface.

DESCRIPTION OF THE PREFERRED EMBODIMENTS

Apparatus of the invention is useful in handling various types of continuous linear elements, including monofilaments, strands, rovings, yarns and cords of natural or synthetic filaments. But the apparatus is especially useful in handling glass strand in a continuous glass filament forming operation. In such operation continuous glass filaments are simultaneously attenuated from streams of molten glass and advanced in strand form to a primary collection region.

FIGS. 1 and 2 illustrate apparatus according to the principles of the invention in a continuous glass filament forming operation. As shown, a rotary device in the form of a hollow pulling wheel 10 is used in forming continuous glass filaments 12 and feeding untwisted bundles or continuous strands 14 of these filaments downwardly to a moving collection surface 16. The individual strands 14 are accumulated on the moving collection surface 16 to form a continuous glass strand mat 18.

In FIGS. 1 and 2 only one pulling wheel 10 is shown; however, in practice there can be twenty or more such wheels above and along the length of the collection surface 16. Each of the pulling wheels 10 normally feeds many individual glass strands 14 back and forth across the width of the collection surface 16. While for clarity the pulling wheel 10 is illustrated feeding three strands 14 onto the collection surface 16, in practice each pulling wheel normally feeds up to 20 individual strands 14 or more.

A movably mounted strand collection container chute 20 is adjacent the pulling wheel 10. During times the pulling wheel 10 is properly feeding the strands 14 to the collection surface the chute 20 is in an inclined or tilted rest position. In such a position the chute 20 does not interfere with delivery of the strands 14 fed to the collection surface 16 by the rotating pulling wheel 10. When needed, usually at start-up of the pulling wheel 10, apparatus is activated to move the chute 20 from its inclined rest position to a position between the pulling wheel 10 and the collection surface 16 to collect the strands 14 as waste. Upon return to its rest position the inclined position of the chute 20 transfers any collected waste strand to a hopper 19.

The chute 20 carries a device 22 for severing the strands 14. In the apparatus shown, movement of th chute 20 brings the apparatus 22 into engagement with the strands 14 for severance. Strand severance is needed during start-up of the pulling wheel 10 to separate the continuous strand collected in the chute 20 from strand fed by the wheel 10 to the collecting surface 16; strand severance is also needed during times the strands 14 have "licked" around the circumferential strand engaging surface of the rotating pulling wheel 10. Accumulation of strand on the rotating pulling wheel 10 during mat forming pulls fed strand upwardly from the collecting surface 16 unless the strands 14 are severed. Upward movement of strand damages the mat 18.

In one broad sense, the severing apparatus includes means providing spaced apart opposing surfaces defining a space for extension of linear elements such as glass strand therethrough and a movable member with a cutting edge spaced from the means defining the surfaces. Further, the apparatus includes means for moving the member laterally of the space in a direction between the opposing surfaces for severance of a linear element extended through the space across the path of the element. The opposing surfaces are sufficiently close to the path of the member to limit lateral movement of the element in its zone of engagement with the cutting edge of the member and thereby promote severance of the element.

The means providing the opposing spaced apart surfaces normally provides converging opposing surfaces for fixing the linear position of a linear element extended through the space.

Referring more particularly to the overall showing of the apparatus in FIG. 1, a stream feeding container 26 holds a body of molten glass. The feeder 10 can receive a continuous supply of glass in several ways. For example, a forehearth can supply molten glass to the feeder 10 from a furnace heating batch mineral material to molten glass. Also, a melter associated with the feeder 26 can supply molten glass to the feeder 26 by reducing glass marbles to a heat-softened condition.

At the ends of the feeder 26 are terminals 28 that connect to a source of electrical energy to heat the feeder 26 by conventional resistance heating. Such heating keeps the molten glass in the feeder 26 at proper filament forming temperatures and viscosities.

Also, the feeder 26 has a bottom wall 30 with orifice openings or passageways for delivering streams 32 of molten glass. As shown, depending orifice projections or tubular members 34 form the orifice openings in the bottom 30 of the feeder 26.

The feeder 26 is normally made of platinum or an alloy of platinum.

The molten glass streams 32 are attenuated downwardly into the individual continuous glass filaments 12 by the pulling effect of the rotating pulling wheel 10.

Gathering shoes 40 below the feeder 26 combine or gather the moving continuous glass filaments into individual bundles (strands 14). The embodiment as shown combines the filaments 12 into three individual strands 14.

Normally apparatus supplies both water and a liquid sizing or binder to the advancing filaments 12. As shown nozzles 42 and 44 are adjacent to the bottom 30 of the feeder 26 and direct water spray onto the continuous glass filaments 12.

A sizing applicator 46 supported within a housing 48 just above the gathering shoes 40 applies a liquid sizing or binder to the swiftly traveling continuous glass filaments 12. The applicator may be any suitable type known to the art; however, as shown, the applicator 46 is an endless belt moved through liquid held in the housing 48. As the continuous glass filaments 12 speed across the surface of the moving endless belt applicator 46, some of the liquid on the surface of the applicator transfers to them.

It is usually desirable to use a complex sizing or binder to promote coherence of the filaments 12 when combined into the strands 14 and to promote non-slipping adherence of the strands 14 to the periphery of the pulling wheel 10. Where the mat produced is to be combined with a plastic resin, it is also desirable to include a coupling agent in the sizing or binder that helps the resin wet the mat.

A preferred form of binder is one retaining sufficient cohesive properties when cured to contribute to binding together of the strands 14 in the mat or other form which they are collected on a conveyor or collecting surface. Such a binder has a dual purpose of holding the filaments together as strands and bonding the strands into an integrated body.

The pulling wheel advances the strands 14 downwardly from the applicator 46 to a multi-grooved shoe 50. The shoe 50 arranges the array of individual strands 14 for advancement onto the circumferential surface 52 of the pulling wheel 10. An idler wheel 54 keeps the strands 14 separated and assists in establishing strand tension. Further, the idelr wheel 54 insures continued proper strand array for advancement to the pulling wheel 10.

The strands 14 travel upwardly from the idler wheel 54 to engage the moving circumferential surface 52 of the rotating pulling wheel 10.

A motor 58, through a belt 60, drives the pulling wheel 10 at high angular speeds in the direction of the arrow (counterclockwise) shown in FIG. 1.

The liquid on the strands 14 "wets" the surfaces of both the pulling wheel 10 and the strands 14.

Apparently the surface tension of liquid wetting the peripheral or circumferential surface of the wheel 10 and the strands 14 provides sufficient tractive force to advance the strands 14 and to withdraw the filaments 12 from the molten glass streams 32. Also, it is theorized that a "belt effect" of strands on the circumference of the rotating pulling wheel 10 provides tractive or attenuating forces.

The pulling wheel 10 includes means for strand removal at selected locations on its circumferential surface 52 during rotation. In FIG. 1, it can be seen that the pulling wheel arrangement uses a driven rotatable spoke or spider wheel 62 within the pulling wheel 10. The wheel 62 includes circumferentially spaced fingers 64 movable through openings or spaces 66 (see FIG. 3) in the circumferential surface 52 of the pulling wheel 10. The fingers 64 progressively contact the strands 14 to disengage them from the circumferential surface of the rotating pulling wheel 10. The strands 14 are projected downwardly by the pulling wheel 10 to the collection surface 16 along paths proceding tangentially from the point of strand discharge from the circumference of the pulling wheel 10.

Referring more specifically to FIG. 3, the pulling wheel 10 as illustrated includes a driven rotatable assembly 70 including the pulling wheel 10, which is shown as open at one side, and an oscillatable assembly 72 for effecting removal of the strands 14 at various locations from the circumferential surface 52 of the pulling wheel 10. A stationary support 74 holds both assemblies.

The support 74 comprising a horizontal stationary support tube 75 held by spaced apart vertical holding members 76 and 77.

The rotary assembly 70 includes the pulling wheel 10 mounted on one end of a drive shaft 80 and a pulley 82 mounted on the other end of the drive shaft 80. The drive belt 60 rides in the pulley 82. The shaft 80 is rotatably held in the stationary support tube 75.

When the motor 58 rotates the shaft through the belt 60, the pulling wheel 60 is driven in high speed rotation.

The strand removal assembly 72 includes an end plate 86, a tube connector 88 and the wheel 62.

As illustrated the tube connector 88 is horizontally mounted on the outside of the stationary support tube 75 for movement about the axis of the shaft 80.

The end plate 86 is circular and is joined to the connector tube 88 at one end and covers the open side of the pulling wheel 10. The diameter of the end plate 88 is slightly more than the inside diameter of the pulling wheel 10 to permit free rotation of the wheel 10. Thus, the end plate 88 and the pulling wheel 10 form a hollow assembly.

The wheel 62 is rotatably mounted on a shaft 90 held on the end plate 88. The shaft 90 extends normally away from the end plate 88. Hence, the shaft 90 extends within the hollow assembly in a direction parallel to the shaft 80.

A timing drive connecting the rotary assembly 70 and the spoke wheel 62 rotates the wheel 62 with the pulling wheel 10. Hence, the fingers 64 moves smoothly in or out of the slots 66 during rotation of the pulling wheel 10. As shown in FIG. 1, the drive includes a pulley 92 on the shaft 90, a pulley 94 on the shaft 80 and a belt 95 convecting the pulleys.

The pulling wheel arrangement includes means for oscillating the end plate 86 (and consequently the spoke wheel 62) to distribute the strands 14 back and forth across the width of the collecting surface 16. Referring to FIGS. 1 and 3, the end plate 86 is driven by apparatus including a fluid cylinder 96, a triangular length 98 and link rod 99. The link rod 99 pivotally connects at one end to arm 100 on the tube connector 88 and at the other end pivotally connects to the triangular link 98 through a linking rod 104. The triangular link 98 is pivotally held on the end of a rod 106.

The strand collection chute 20 adjacent the pulling wheel 10 can be more clearly seen in FIGS. 1, 2 and 11 to include a bottom 110 and side walls 112. The bottom 110 and side walls 112 form a forward strand collection region 114 and a rearward strand transfer region 116.

An inclined stationary support 120 carries the chute 20.

Apparatus moves the strand collection chute 20 from the inclined rest position (indicated by dashed lines in FIG. 1 and shown in FIG. 2) to the position effective to receive strand from the pulling wheel 10. As shown the chute moving apparatus is on the support 120 and includes an air motor 122 (which includes an air cylinder 124, piston 126 and piston rod 128), a rack 130, a pinion gear 132 and a pare of arms 134.

One end of each of the arms 134 is fixed on a shaft 136 that is rotatably mounted on the stationary support 120. The other end of each of the other arms 134 is fixed to a shaft 138 that extends between mountings 140 at the rearward end of the chute 20. Hence, movement of the arms 134 about the axis of the shaft 136 moves the chute 20 between its tilted rest location and its strand collection location under the pulling wheel 10.

The piston rod 128 of the air motor 122 is connected to the rack 130, which is movably mounted on the support 120. The rack 130 engages the pinion gear 132, which is fixed on the shaft 136. As the air motor 122 extends the piston rod 128, the rack 130 moves forward (upward and to the left in FIG. 1) to move the pinion gear 132 (and hence shaft 136). The chute 20 is moved upward and over the upper end of the support 120 into the strand collection position, which in practice is still a slightly upwardly tilted position for the chute 20. As the piston rod 128 is retracted into the cylinder 124, the rack 130 moves the pinion gear 132; the chute 20 is returned to its rest position.

Air under pressure is supplied to the air cylinder 124 through supply lines 142 and 144. A solenoid control valve 148 regulates air supplied to the cylinder 124.

It has been useful to incline the chute 20 upwardly about 45 degrees from the horizontal for a rest position when it is mounted close to the pulling wheel 10 like shown in FIGS. 1 and 2. Further, it has been useful to have the chute 20 inclined between 15 and 30° from the horizontal in its strand collection location.

As illustrated the strand severing apparatus 22 is fixed at the forward end of the chute 20 and hence, moves with the chute.

FIGS. 4, 5, 6, and 7 show the strand severing apparatus 22 in more detail. As illustrated the apparatus 22 includes a flanged metal box 150 carrying strand retaining means in the form of a longitudinal member 15 with a central comb-like section having spaced apart side-by-side extension members or fingers 154 forming spaces 156 between them through which linear elements such as glass strand can extend. The fingers 154 are equal length and in side-by-side planar relationship as shown. Further, the fingers 154 are shown in a preferred form; each of the fingers 154 taper from its base end towards its free end or tip. Hence, the fingers 154 provide converging edge surfaces 154e defining spaces 156. Each of the spaces 156 narrow to an apex region 156a at the base region of each of the fingers 154. The apex regions 156a are of such a size with respect to the strands 14 that the fingers 154 (edge surfaces 154e) engage the strands 14 (usually individually) sufficiently to stop linear movement of the strands caused by the pulling effect of the moving collection surface 16. The edges 154e intersect at an angle A (see FIG. 7); angle A is normally from 10 to 15°.

At each end of the member 152 is a guide portion 158 providing strand guide edges 160 slanted with respect to the fingers 154. The edges 160 are positioned (inclined) to effectively guide strand into the spaces 156 at the ends of the row of fingers 154.

The fingers 154 project beyond the forward open end of the chute 20.

The apparatus 22 further includes a member 162 with a cutting edge 163 and a strand severance backing surface 164 disposed adjacent the fingers 154. The blade 162 is mounted for movement at one side of the member 152 in a transverse direction to the fingers 154 into strand severing engagement with strand against the surface 164 for strand extended through the spaces 156 across the path of the member 162.

The apparatus 22 is shown in a preferred embodiment with the surface 164 disposed normal to the plane in which fingers 154 project and with an elongated notch or groove 166 in the surface 164. The groove 166 extends along a straight line in a direction parallel to the plane in which the fingers 154 extend. And in transverse cross section the walls of the notch 166 normally define a "V;" in practice it is usual to have the walls of the notch 166 intersect at right angles.

A member 168 carried by the box 150 provides a hard surface 164. While it has been the practice to use a member 168 made of hard metal, it is possible to use a member providing a resilient surface for the surface 164. Also, it is possible to use a strand severance backing surface without a groove (e.g., the groove 166). But a strand severance backing surface with a groove is preferred.

The member 162 is shown as a circular blade rotatably mounted with its axis of rotation parallel with the surface 164. Further the circular blade 162 is mounted for movement with its cutting edge 163 in strand severing communication with the groove 166. A guide extension 170 of a movable carriage 172 carries the blade 162 for movement along the surface 164 in the groove 166. In operation the blade 162 is reciprocated back and forth in the groove for severance of strand extending across the groove 166.

It has been useful to use a blade 162 having a cutting edge 163 formed by surfaces intersecting at an angle of about 60°.

The blade 162 can be nonrotatably held. Also, other forms of cutting members can be used.

The fingers 154 are sufficiently close to the path of the blade 162 to limit the lateral movement of strands in their zone of engagement with the cutting edge and thereby promote strand severance. Such an immediately adjacent relationship between the fingers 154 and path of the blade 162 will change somewhat with strands of different diameter and with the material of the linear elements to be severed. The flexural rigidity of linear elements increases with a decrease in length. In practice a distance "D" (see FIG. 5) that is normally less than 0.5 of an inch (0.375 to 0.5 being preferred) is used with glass strands for limiting lateral movement to assist in strand severance.

FIG. 8 shows a portion of another strand retaining member 152' with side-by-side spaced apart untapered fingers 154' forming spaces 156' therebetween. The ends of the member 152' have guide portions 158' with strand guide edges 160'.

The movable carriage 172 is disposed between the bottom of the box 150 and the support block 168. The carriage 172 is an assembly that includes a forward member 174 and a rearward member 176; these members are joined together. The carriage 172 further includes wheels 178 that are rotatably mounted on the rearward member 176 and engage the rearward side 179 of the support block 168.

The carriage assembly 172 provides an arrangement that resiliently urges the cutting edge 163 of the circular blade 162 into the elongated notch 166. Bolts 180a and 180b extend through passageways in the rearward member 176 and thread into the forward member 174. Compression springs 182a and 182b are on the bolts 180a and 180b respectively in the passageways in the rearward member 176. These springs are compressed between shoulder regions 184 in the rearward portion passageways and the heads of the bolts 180a and 180b. Hence, the forward member 174 and rearward member 176 are urged together by the springs 182a and 182b. Accordingly, the circular blade 162 is resiliently urged into the groove 166.

The severing apparatus 22 includes means for reciprocating the blade 162 laterally of the extensions 154 in the groove 166. The embodiment shown uses a fluid reciprocating means in the form of a cable cylinder device including a cylinder 190, a piston 192, rollers 194 and 196 and cables 198 and 200. Each of the cables is joined at one of its ends to opposite sides of the piston 192 within the cylinder 190. Each of the cables extends axially outwardly of the cylinder 190 and turns on one of the rotatably mounted rollers 194 and 196. The other end of each of the cables 198 and 200 secure to a U-bracket 202 fixed on the rearward member 176 of the carriage assembly 172.

Air under pressure supplied alternately to the cylinder 190 on opposite sides of the piston 192 moves the cables 198 and 200 to reciprocate the carriage 172 (and hence the blade 162). Cable cylinders like the one shown are available commercially from TOL-O-MATIC, INC. under the designation "Cable-Cylinder."

Thus, the strand severing apparatus 22 comprises strand retaining means including spaced apart extensions through which a linear element such as glass strand can extend; a strand severance backing surface immediately adjacent the strand retaining means; a blade mounted for movement transversely of the extensions to move its cutting edge into severing engagement with strand against the backing surface; and means for moving the blade. The extensions are sufficiently close to the path of the blade to limit lateral movement of the strand in the zone of engagement with the blade to assist strand severance.

The forward portion 170 of the carriage 172 is shaped to provide slanted guide edges 204 that push errant strands into the spaces 156 between the fingers 154 during reciprocation of the carriage 172. As shown the dimensions of the portion 170 permit the cutting edge of the blade 162 to extend in part beyond the edges 204. In practice the edges 204 are slanted to form an angle B with the direction of carriage movement (see FIG. 9). Angle B is normally between 65 and 80°, with an angle B of 75° being preferred.

FIG. 9 shows an air supply system for the cylinder 190. The supply includes a main supply line 206 and two branch lines 208 and 210 providing air under pressure to a control valve 212. Air from the valve 212 is provided to the cylinder 190 through supply lines 214 and 216.

The branch line 208 has a solenoid actuated valve 218 controlling the supply of air to the end of the valve 212.

The control valve 212 is a commercially available shuttle valve. The position of an internal shuttle core regulates air supply through the lines 214 and 216.

When air is provided to the valve 212 through line 208, the shuttle core is reciprocated. Reciprocation of the shuttle core effects air supply to first one of the lines 214 and 216 and then to the other.

FIG. 10 shows a simple overall electric control for the operation of the chute 20 and strand severing apparatus 22.

In operation at start-up of the pulling wheel 10 an operator closes a control switch 220. A control relay CR1 is energized. The energized control relay CR1 closes contacts that actuate the valve 142 (see FIG. 1) to provide air under pressure to the cylinder 124 through the supply line 144 to extend the piston rod 128 (rack 130). The clutch 20 is moved into its strand collection position and the extended piston rod 128 engages a limit switch LS1. Electrical energy is supplied through the closed switch LS1 to a time delay relay T and to a control relay CR2 through a closed contact T-1.

The energized relay CR2 actuates the solenoid control valve 218 to supply air to the shuttle core within the valve 212. The blade 162 is reciprocated; however, at start-up the operator normally positions the chute 20 in its strand collection position before the strands 14 are provided to the pulling wheel 10.

The timer is set to time out (open contact T-1) upon a desired member of blade reciprocations, which may be only one pass of the blade 62 along the notch 166. But normally 5 to 7 reciprocations are used.

Next, the operator provides the strands 14 to the rotating pulling wheel 10, which advances the strands 14 as a band into the strand collection region 114 of the chute 20 as shown in FIG. 1. During this time the band of strands 14 are normally oscillated back and forth across the chute 20 as indicated by the dashed strand lines in FIG. 1.

The operator opens the switch 220 to de-energize the control relay CR1. The valve 148 is activated to supply air to the cylinder 124 through the supply lines 142. The piston rod 128 is retracted. And the chute 20 begins to move towards its inclined rest position.

The pulling wheel 10 continues to deliver the strands 14.

The rotating pulling wheel 10 feeds the strands 14 to the moving collection surface 16 as the chute 20 moves out of the oscillating path of the band of strands 14. But strands 14 cascade to hang over the forward end of the chute 20 between the chute and collection surface as indicated in FIG. 11 because the strands 14 are continuous.

Movement of the collection surface tends to move the strands 14 downstream of the chute 20 as indicated in FIG. 12.

As the chute 20 tilts towards its inclined rest position, the forward end of the chute moves upwardly. Hence, the strand severing apparatus 22 is also moved to position its extensions 152 to point upwardly.

The strands 14 are divided into the spaces 156 between the extensions 154 so that the strands 14 are at the base regions of the spaces 156 as generally shown in FIG. 11. Strands at the ends of the member 152 are guided by the edge 160 into a space 156.

The moving strands 14 position themselves into the apex regions 156a where they are engaged sufficiently by the fingers 154 to stop linear motion and thereby fix the linear position of the strands 14.

When the chute 20 arrives at its inclined rest position on the support 120, the piston rod 128 engages a limit switch LS2. Electrical energy is once again supplied to the timer T and to the control relay TR2. The carriage 172 is moved to reciprocate the blade 162 the groove 166. The moving blade 162 progressively engages the strands 14 on the surface 166 and cooperates with the walls of the groove 166 to sever the strands 14. The slant guide surfaces 204 push errant strands into severing relationship with the blade 162. The free lengths of the severed strands 14 fall onto the collection surface 16. The accumulation of strand 14 in the inclined chute 20 is transferred to the hopper 19.

The timer T times out to open the contacts T1. The blade 162 ceases to reciprocate and comes to rest at one end of the member 152 under the portion 158 as indicated in dashed lines in FIG. 4.

The strand severing apparatus 22 is shown actuated at two locations, i.e. upon arrival of the chute 20 at its strand collection position and upon arrival of the chute 20 at its inclined rest position.

During the times the strands 14 are accumulating on the rotating pulling wheel 10 strand severance is effected by the device 22 when the chute 20 is in its strand collection position. When a strand "hang-up" on the rotating pulling wheel 10 occurs, the operator closes switch 220 to move the chute 20 towards its strand collection position. As the chute moves, the member 152 passes through the paths of the strands 14. The strands move into the spaces 156 between the extensions 154. Upon arrival of the chute 20 at its strand collection position, the control apparatus operates to reciprocate the blade 162 and effect strand severance.

We claim:
1. Strand severing apparatus comprising:
   a strand severance backing surface;
   at least two side-by-side spaced apart members projecting in a direction outwardly of the strand severance backing surface forming spaces between them through which strand can extend;
   a blade mounted for movement transversely of the members with its cutting edge in strand severing relationship with the strand severance backing surface; and
   means for moving the blade to bring the cutting edge into severing engagement with strand against the backing surface for severance of strand extended through the space across the path of the member at the surface, the members being sufficiently close to the path of the blade to limit the lateral movement of strand in the zone of engagement with the member to promote strand severance.
2. Apparatus of claim 1 in which the opposing surfaces converge.
3. Strand severing apparatus comprising:
   strand retaining means comprising two spaced apart extensions through which a strand can extend;
   a strand severance backing surface disposed immediately adjacent the strand retaining means;
   a blade mounted for movement transversely of the extensions with its cutting edge in strand severing relationship with the strand severance backing surface; and
   means for reciprocating the blade to bring the cutting edge into severing engagement with strand against the backing surface for severance of strand extended through the spaces across the path of the blade, the extensions being sufficiently close to the path of the blade to limit lateral movement of strand and thereby promote strand severance.

4. Apparatus of claim 3 in which the extensions project generally normally of the strand severance backing surface.

5. Apparatus of claim 4 in which the blade is circular.

6. Apparatus of claim 5 in which the circular blade is rotatable.

7. Strand severing apparatus comprising:
side-by-side spaced apart strand retaining fingers defining a space therebetween through which strand can extend;
a strand severance backing surface disposed immediately adjacent to and generally normal to fingers, the surface including a groove extending transversely of the fingers;
a circular blade with a cutting edge movable along the groove with its cutting edge in strand severing communication with the walls of the groove; and
means for reciprocating the blade back and forth along the groove to sever strand extended through the spaces between the fingers across the path of the blade at the surface, the fingers being sufficiently close to the groove to limit the lateral movement of strand in the region of the groove during reciprocation of the blade to promote strand severance.

8. Apparatus of claim 7 in which the groove is linear.

9. Apparatus of claim 8 further including means resiliently urging the cutting edge of the blade against the base of the groove.

10. Apparatus of claim 4 in which the means for reciprocating the circular blade is fluid means.

11. Apparatus of claim 10 in which the fingers are larger in cross section at their base ends to form spaces tapering towards theri base regions to fix the linear position of strand.

12. Apparatus of claim 11 in which the fingers form V-shaped spaces at their base regions, the spaces being sufficiently narrow at their apex regions to stop linear movement of strand extending therethrough and thereby fix the linear position of strand for severance.

13. Strand handling apparatus comprising:
rotary means for linearly feeding strand to a collection region;
strand severing means including side-by-side spaced apart strand retaining fingers, a strand backing surface disposed immediately adjacent to and generally normal to the fingers, the surface having a groove disposed transversely of the fingers, a circular blade with a cutting edge mounted for movement along the groove into severing engagement with strand disposed across the groove, means for reciprocating the blade back and forth along the groove; and
means for positioning the linearly fed strand through the space between the fingers, the fingers being sufficiently close to the groove to limit the lateral movement of strand in the region of the groove during reciprocation of the blade and thereby promote strand severance.

* * * * *